(No Model.)

W. S. TAYLOR.
RECIPROCATING HARVESTER KNIFE.

No. 335,397. Patented Feb. 2, 1886.

Witnesses.
A. Ruppert.
Alfred V. Gage.

Inventor:
Wm. S. Taylor,
Per
Lenox Simpson & Co.

United States Patent Office.

WILLIAM STITT TAYLOR, OF HUNTINGDON, PENNSYLVANIA, ASSIGNOR TO M. S. TAYLOR, OF SAME PLACE.

RECIPROCATING HARVESTER-KNIFE.

SPECIFICATION forming part of Letters Patent No. 335,397, dated February 2, 1886.

Application filed July 10, 1884. Serial No. 137,307. (No model.)

*To all whom it may concern:*

Be it known that I, WILLIAM S. TAYLOR, of Huntingdon, in the county of Huntingdon and State of Pennsylvania, have invented a new and useful Improvement in Reciprocating Harvester-Knives, of which the following is a specification.

The object of the invention is to insure the cutting of straw, grass, or weeds which may escape the ordinary angular cutters and is calculated to clog and interfere with the proper working of the cutter-bar.

Figure 1:
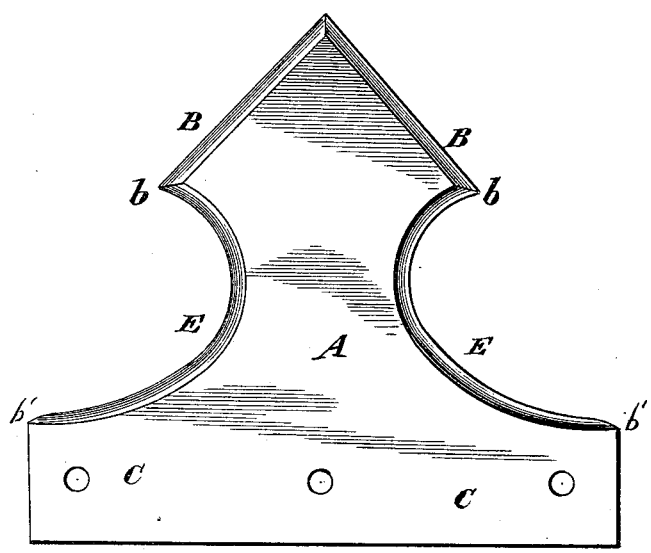
Figure 2:
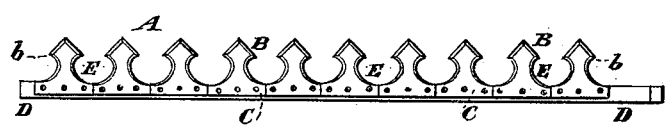

Figure 1 of the drawings is a plan view of my invention, and Fig. 2 a similar view of the knives when on the cutter-bar.

In the drawings, A represents my harvester-knife, with the ordinary angular cutting-edge, B, in front, and with a shank, C, adapted to be secured to the cutter-bar D in any suitable manner. Between these old parts I form a sharp and cutting edge, E, which begins at the farther extremity of the wings of cutter B, so as to there form a hook, $b$. From this hook-curve the edge E runs to the end $b'$ on the arc of a larger circle, so that as the knife moves laterally it has a drawing cut. When two of these knives are together, as shown in Fig. 2 of the drawings, it will be observed that this draw-cut works against the grain or grass which may have escaped the cutter B in both directions, or on each stroke, while the hooks $b\ b$ prevent the said grain or grass from working out in front between the cutters B.

Having thus described my invention, I would state that I am aware of all that is shown in patents Nos. 18,229 and 89,546.

What I claim as new, and desire to protect by Letters Patent, is—

A harvester-knife having the sharp edge E hooked at $b$ and running in the form of a part of an ellipse from said hook to the end $b'$, the same being arranged between the shank C and the front cutter, B, substantially as shown and described.

WILLIAM STITT TAYLOR.

Witnesses:
JAMES KELLY,
HIRAM DE HUFF.